US011575299B2

United States Patent
Lahr et al.

(10) Patent No.: US 11,575,299 B2
(45) Date of Patent: Feb. 7, 2023

(54) METHOD FOR HEAT-TREATING MAGNET WEB REGIONS OF A ROTOR

(71) Applicant: GM GLOBAL TECHNOLOGY OPERATIONS LLC, Detroit, MI (US)

(72) Inventors: Derek F. Lahr, Howell, MI (US); Alireza Fatemi, Canton, MI (US); Anthony M. Coppola, Rochester Hills, MI (US); Sean R. Wagner, Shelby Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 519 days.

(21) Appl. No.: 16/736,203

(22) Filed: Jan. 7, 2020

(65) Prior Publication Data
US 2021/0211025 A1 Jul. 8, 2021

(51) Int. Cl.
*H02K 15/03* (2006.01)
*H02K 1/27* (2022.01)
(Continued)

(52) U.S. Cl.
CPC ............ *H02K 15/03* (2013.01); *H02K 1/276* (2013.01); *H02K 7/006* (2013.01); *H02K 15/12* (2013.01);
(Continued)

(58) Field of Classification Search
CPC .. B60K 6/26; B60Y 2200/91; B60Y 2200/92; B60Y 2400/60; H02K 1/276;
(Continued)

(56) References Cited

U.S. PATENT DOCUMENTS 4,486,679 A * 12/1984 Jones .................. H02K 1/2766
310/407
4,570,333 A * 2/1986 Jones ..................... H02K 1/276
29/515

(Continued)

FOREIGN PATENT DOCUMENTS

DE 102017206092 A1 * 10/2018 ........... H02K 1/2773
JP 2011067027 A * 3/2011

OTHER PUBLICATIONS

Translation of foreign document DE 102017206092 A1 (Year: 2018).*

*Primary Examiner* — Alex W Mok
(74) *Attorney, Agent, or Firm* — Quinn IP Law

(57) ABSTRACT

A method for constructing a rotor assembly for use with a rotary electric machine includes forming annular rotor laminations from metal blanks. Each lamination has a radial axis and an outer diameter surface. Multiple magnet web regions are defined in proximity to the outer diameter surface. Each web regions includes asymmetrical openings defined by a radially-extending strut and arcuate peripheral bridges. The method includes coaxially stacking the laminations into a rotor stack, including positioning every other lamination a predetermined angular distance with to unmask the bridges and/or struts and mask remaining surface area of the laminations. The rotor stack is subjected to a heat-treating process to harden only the unmasked bridges and/or struts. The method includes connecting a rotor shaft to the stack to construct the rotor assembly, with the web regions corresponding to a respective rotor magnetic pole.

20 Claims, 4 Drawing Sheets

(51) Int. Cl.
*H02K 15/12* (2006.01)
*H02K 21/14* (2006.01)
*H02K 7/00* (2006.01)
*H02K 1/276* (2022.01)
*B60K 6/26* (2007.10)

(52) U.S. Cl.
CPC ............... *H02K 21/14* (2013.01); *B60K 6/26* (2013.01); *B60Y 2200/91* (2013.01); *B60Y 2200/92* (2013.01); *B60Y 2400/60* (2013.01)

(58) Field of Classification Search
CPC ...... H02K 1/2766; H02K 15/03; H02K 15/12; H02K 21/14; H02K 7/006
USPC ..................................................... 310/156.56
See application file for complete search history.

(56) References Cited

U.S. PATENT DOCUMENTS

| | | | | |
|---|---|---|---|---|
| 5,650,680 | A * | 7/1997 | Chula | H02K 3/16 |
| | | | | 310/216.123 |
| 9,088,189 | B2 * | 7/2015 | Buskirk | H02K 1/2766 |
| 9,941,775 | B2 * | 4/2018 | Fiseni | H02K 1/28 |
| 2013/0241339 | A1 * | 9/2013 | Buskirk | H02K 1/2766 |
| | | | | 310/156.53 |
| 2013/0326855 | A1 * | 12/2013 | Ijspeert | H02K 1/278 |
| | | | | 29/428 |
| 2015/0035402 | A1 * | 2/2015 | Reddy | H02K 21/16 |
| | | | | 310/156.01 |
| 2018/0198352 | A1 * | 7/2018 | Perry | H02K 1/2766 |

\* cited by examiner

METHOD FOR HEAT-TREATING MAGNET WEB REGIONS OF A ROTOR

INTRODUCTION

Electric traction motors, electric generators, and motor-generator units are collectively referred to in the art as rotary electric machines. Electric machines typically include a stator that is spaced a short distance apart from a rotor by a radial or axial air gap. In a radial flux-type machine in particular, equally-spaced stator teeth project radially-inward toward the rotor. Adjacent stator teeth are separated from one other by a respective stator slot. Stator windings are formed by winding the stator teeth with conductive wires or by filling the stator slots with solid bar conductors. In a polyphase electric machine, an alternating current input voltage is applied to phase leads of the stator windings to energize the stator and thereby generate a rotating stator magnetic field.

The rotor of an interior permanent magnet (IPM)-type electric machine includes an embedded set of strong permanent magnets. Unlike the stator electromagnets resulting from the sequential energization of the above-noted stator windings, the rotor's embedded permanent magnets collectively establish a time-invariant magnetic field. The stator and rotor magnetic fields interact with each other to produce and sustain motive forces within the stator-rotor airgap. Such forces ultimately impart rotation to the rotor and a connected rotor shaft. Torque from the rotor and rotor shaft is then directed to a coupled load. Other electric machines such as synchronous reluctance motors forego use of permanent magnets in the rotor but operate to similar effect on the coupled load.

A typical electric machine rotor includes a cylindrical rotor stack constructed from a stack-up of thin layers of steel or another magnetically-permeable material. Each individual layer is commonly referred to in the art as a rotor lamination. The various rotor laminations define a set of openings. When the rotor laminations are stacked together, cavities are formed from the openings, with the openings of an IPM configuration of the rotor receiving therein a respective permanent magnet. An IPM rotor configuration may form its rotor magnetic poles using a "single-V" or a "dual-V" arrangement of solid bar magnets located adjacent to the rotor's outer diameter surface. The angular orientation or "V-angle" of the arranged rotor magnets may open toward the outer diameter surface of the rotor in a typical magnet configuration.

The above-noted rotor openings of the individual rotor laminations, whether of the IPM or synchronous reluctance rotor variations, are separated by narrow strips of lamination material referred to as "bridges" and "struts", with the bridges and struts of a given rotor pole collectively referred to herein as a "magnet web region". The bridges extend around the outer periphery of the annular laminations, and thus are arcuate in their plan-view shape and peripheral in their location with respect to the laminations, while the struts extend radially between inner distal ends of the rotor openings. Together, the bridges and struts provide requisite structural support around the rotor openings. However, the bridges and struts can also short-circuit beneficial flux paths within the rotor, which in turn can reduce the operating efficiency of the electric machine.

In order to increase the strength of the magnet web regions, rotor manufacturing techniques sometimes include subjecting individual rotor laminations to a heat-treating process prior to constructing the rotor stack. Such a process also has the benefit of reducing the magnetic reluctance of the arcuate peripheral bridges and radial struts, which in turn helps address the above-noted flux path short-circuiting problem. During heat-treating, the surface area of the laminations other than the web regions may be masked using a suitable masking material, leaving the bridges and struts exposed to high temperatures and a gaseous heat-treating atmosphere. The masking material is then carefully removed after completing the heat-treating process. The resulting rotor laminations are thereafter stacked together and connected to a rotor shaft and end rings to complete assembly of the rotor.

SUMMARY

The present disclosure relates to an improved methodology for selectively heat-treating the bridges and struts of a rotor for use in a rotary electric machine. Each magnet web region of a given rotor lamination corresponds to a magnetic pole of the rotor, as is well understood in the art. Together, the bridges and struts define individual rotor openings adjacent to an outer diameter surface of the rotor. As part of the disclosed method, the rotor laminations are assembled into a rotor stack such that the bridges and/or struts of adjacent laminations, or portions thereof, are offset with respect to each other when viewed along the center axis of the rotor stack. That is, when a rotor stack is viewed along its center axis the offset geometry effectively masks the surface area of the laminations lying outside of the magnet web regions, while at the same time leaving the bridges and/or struts exposed. Consequently, the exposed bridges and/or struts, depending on the embodiment, are exposed to a heat-treating atmosphere during a subsequent heat-treating process of the assembled rotor stack. The present approach therefore eliminates the additional time required for applying and removing masking material from the rotor laminations, as well as the manufacturing costs associated therewith.

The disclosed approach may be used to help ensure that the bridges and/or struts are sufficiently and effectively hardened via heat-treating of the rotor stack prior to or after connecting a rotor shaft without reducing the magnetic permeability of the remaining structure of the rotor laminations. The strengthened web regions may help to enable higher-speed operation of the rotor without requiring a corresponding increase in thickness of the bridges and/or struts.

In an exemplary embodiment, a method for constructing a rotor assembly for use with a rotary electric machine includes forming annular rotor laminations from metal blanks, e.g., 0.25 mm steel sheet metal blanks. Each lamination has a radial axis and an outer diameter surface, and defines multiple spaced magnet web regions in proximity to the outer diameter surface, i.e., the circular outer periphery of the rotor laminations. The magnet web regions correspond to a respective magnetic pole of the rotor.

Each of the magnet web regions includes multiple asymmetrical rotor openings with inner and outer distal ends, with "outer" and "inner" referring to relative proximity to the outer and inner diameter surface of the lamination, respectively. The opposite inner and outer distal ends are respectively defined by a radial strut and an arcuate bridge, with the rotor openings also defined by transverse reluctance paths. Thus, the magnet web regions described herein include the struts, bridges, and reluctance paths.

The method according to this particular embodiment includes coaxially-stacking the rotor laminations to form a rotor stack, including rotating or otherwise positioning every other one of the laminations about an axis thereof by a predetermined angle with respect to an adjacent one of the laminations. This serves to unmask the bridges and/or struts and mask remaining surface area of the laminations, with the asymmetry noted above enabling such masking. When viewed along the center axis/axis of rotation of the rotor, alternating bridges and/or struts are offset with respect to each other and visible through the rotor openings. The particular axis about which the above-noted rotation occurs may be a radial axis or the center axis of the laminations/rotor stack in different embodiments, depending on which portions of the web regions are to be exposed during the heat-treating process.

The method set forth herein may include connecting a rotor shaft to the rotor stack to construct the rotor assembly before or after the rotor stack is subjected to the heat-treating process. Such a process hardens the unmasked bridges and/or struts without hardening the remaining surface area of the laminations.

Forming the annular rotor laminations may include stamping or punching asymmetrical rotor openings in each of the laminations. In such an embodiment, the asymmetrical rotor openings may optionally include one or more V-shaped sets of rotor openings separated by a respective strut, with each opening defining a V-angle that opens toward the outer diameter surface.

The metal blanks may be coated with an insulating material. The method in such an embodiment may include removing the insulating material from the web regions prior to subjecting the rotor assembly to the heat-treating process.

The method may further include stacking the laminations in a predetermined stacking pattern prior to forming the rotor stack, such that the struts of an adjacent pair of the laminations do not overlap, and then etching the insulating material from the web regions.

The heat-treating process in various non-limiting exemplary embodiments may be a ferritic nitrocarburizing process, a gaseous nitriding process, a plasma nitriding process, or a salt bath nitriding process.

Possible embodiments of the present method also include positioning the rotor assembly radially within a stator assembly to construct the rotary electric machine. The rotary electric machine may be used in some embodiments to provide torque to a transmission of a motor vehicle.

A rotary electric machine is also disclosed herein that has a rotor assembly disposed radially within a stator assembly. The rotor assembly includes a rotor stack constructed from coaxially-stacked annular rotor laminations, each of which includes a radial axis and an outer diameter surface. Each lamination also defines multiple spaced asymmetrical heat-treated magnet web regions in proximity to the outer diameter surface. The magnet web regions include multiple rotor openings defined by a radially-extending strut and one or more arcuate periphery bridges, with the openings each possibly containing a permanent magnet in some non-limiting embodiments. Every other one of the laminations is rotated by a predetermined angle with respect to the radial or center axis. A pair of end plates is connected to a respective axial end of the rotor stack. A rotor shaft is connected to an inner diameter surface of the laminations. The magnet web regions correspond to a respective magnetic pole of the rotor assembly.

An exemplary method for constructing a rotary electric machine includes forming annular rotor laminations from metal blanks. Each of the rotor laminations has a radial axis and an outer diameter surface, and defines multiple spaced magnet web regions in proximity to the outer diameter surface. Each of the magnet web regions includes a pair of asymmetrical V-shaped rotor openings defined by a radially-extending strut and arcuate periphery bridge, with the rotor openings having a V-angle opening toward the outer diameter surface.

The method in this particular embodiment includes coaxially-stacking the annular rotor laminations to form a rotor stack, including positioning every other one of the laminations at a predetermined angle with respect to the radial or center axis to unmask the bridges and/or struts and mask a remaining surface area of the laminations. The magnet web regions correspond to a respective magnetic pole of the rotor. The method may include removing an insulating material from the web regions, subjecting the rotor stack as a whole to a predetermined heat-treating process to harden only the unmasked periphery bridges and/or radial struts, and then positioning the rotor assembly radially within a stator assembly to thereby construct the rotary electric machine. The method may include connecting a rotor shaft to the rotor stack to construct the rotor assembly, either prior to or after performing the heat-treating process.

The above summary is not intended to represent every possible embodiment or every aspect of the present disclosure. Rather, the foregoing summary is intended to exemplify some of the novel aspects and features disclosed herein. The above features and advantages, and other features and advantages of the present disclosure, will be readily apparent from the following detailed description of representative embodiments and modes for carrying out the present disclosure when taken in connection with the accompanying drawings and the appended claims.

Figure 1:
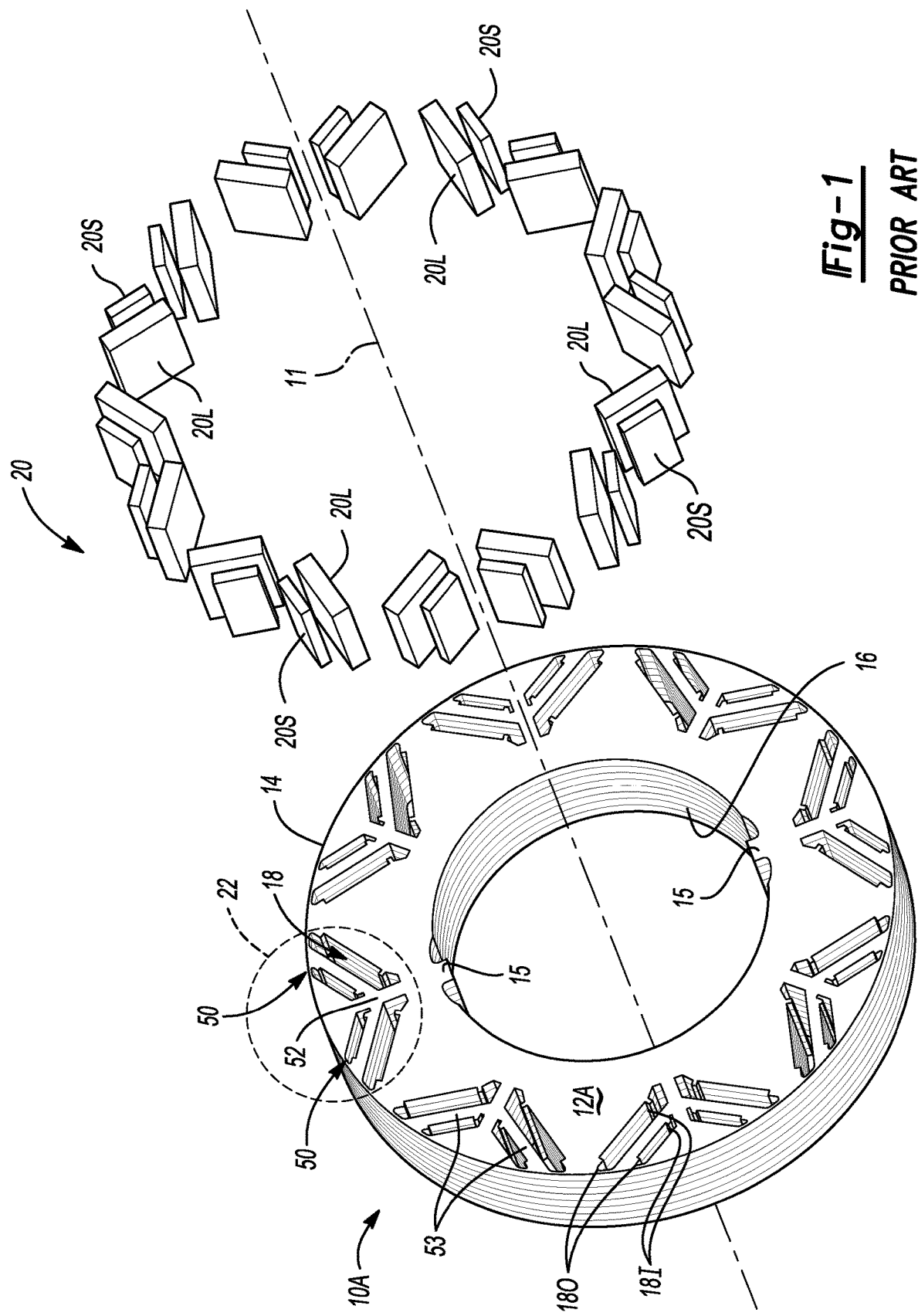
FIG. 1 is a schematic exploded perspective view illustration of a portion of a prior art rotor stack whose construction is altered as set forth herein.

The present disclosure is susceptible to modifications and alternative forms, with representative embodiments shown by way of example in the drawings and described in detail below. Inventive aspects of this disclosure are not limited to the disclosed embodiments. Rather, the present disclosure is intended to cover modifications, equivalents, combinations, and alternatives falling within the scope of the disclosure as defined by the appended claims.

DETAILED DESCRIPTION

Referring to the drawings, wherein like reference numbers refer to the same or like components in the several Figures, a portion of a prior art rotor stack 10A having a longitudinal center axis 11 is depicted schematically in FIG. 1. When the rotor stack 10A is incorporated into a rotor assembly, the center axis 11 becomes the axis of rotation of the rotor assembly. As will be appreciated by one of ordinary skill in the art, the rotor stack 10A may be constructed from an application-suitable number of thin annular rotor laminations 12A, with each lamination 12A having a thickness of about 0.20-0.30 mm in a typical embodiment. Being annular, each lamination 12A has a circular outer diameter surface 14 and a circular inner diameter surface 16. The laminations 12A may define radial teeth or splines 15 that engage a rotor shaft. As will be described in detail below, the laminations 12A shown in FIG. 1 are modified as set forth herein to construct laminations 12 of FIG. 3A to enable targeted heat-treating of magnet web regions 22 thereof. Such magnet web regions 22 of the laminations 12A are depicted in FIG. 1 without the offset geometry of the laminations 12 of the present disclosure, with the structure of the laminations 12A and 12 being otherwise identical.

For a typical rotor stack 10A, the axial orientation of the various rotor laminations 12A is identical along the entire length of the center axis 11. As noted above, prior to constructing the rotor stack 10A, the individual rotor laminations 12A are sometimes subjected to a heat-treating process after carefully masking the magnet web regions 22 with a suitable masking material. The magnet web regions 22 of a typical rotor lamination 12A and the laminations 12 of the present disclosure may include one or more pairs of V-shaped rotor openings 18. In a non-limiting interior permanent magnet embodiment, each opening 18 may be configured to receive a respective permanent magnet 20, i.e., a relatively large bar-type permanent magnet 20L or a relatively small bar-type permanent magnet 20S as shown at right in FIG. 1. Other configurations may be envisioned that forego use of the permanent magnets 20, e.g., synchronous reluctance machines, and therefore the permanent magnets 20 may or may not be included in the construction of the rotor stack 10A. However, for illustrative clarity the openings 18 are referred to hereinafter as magnet openings 18 regardless of whether permanent magnets 20 are present therein.

Each magnet opening 18 extends between radially inner and outer distal ends 18I and 18O, with the outer distal end 18O being adjacent to the outer diameter surface 14 and separated therefrom by a thin arcuate strip of lamination material referred to herein as a bridge 50. The inner distal ends 18I are separated from each other by a thin radially-extending strip of lamination material referred to herein as a strut 52. The remainder of the magnet openings 18 is defined by surrounding material referred to as transverse reluctance paths 53, with the struts 52 either intersected by or terminating in one of the transverse reluctance paths 53 as shown and as appreciated in the art.

As will be described below with reference to FIGS. 2-5, the present approach modifies the depicted construction of the laminations 10A of FIG. 1, along with a sequence of assembly and heat-treating, to alternate the orientation of adjacent laminations 12 (FIGS. 3 and 3A) along the center axis 11. The alternating orientation of laminations 12 when viewed along the center axis 11 ultimately enables the bridges 50 and/or the struts 52 of the magnet web regions 22 to be exposed/unmasked to a heat-treating atmosphere while, at the same time, the remaining surface area of the laminations 12 is effectively masked from such an atmosphere by the adjacent laminations 12.

The rotor laminations 12 of the present disclosure may be individually stamped or punched from thin sheet metal blanks, e.g., machine steel or another magnetically permeable material. Such blanks may be coated before or after stamping with a dielectric insulating material, e.g., insulating varnish. As shown with the laminations 12A of FIG. 1, the laminations 12 of the present disclosure are annular, and thus likewise have circular outer and inner diameter surfaces 14 and 16, respectively. When a sufficient number of the laminations 12 are stacked one on top of the other, the rotor stack 10 takes on a cylindrical shape as depicted in FIG. 2 for inclusion in a rotor assembly 26.

Figure 2:
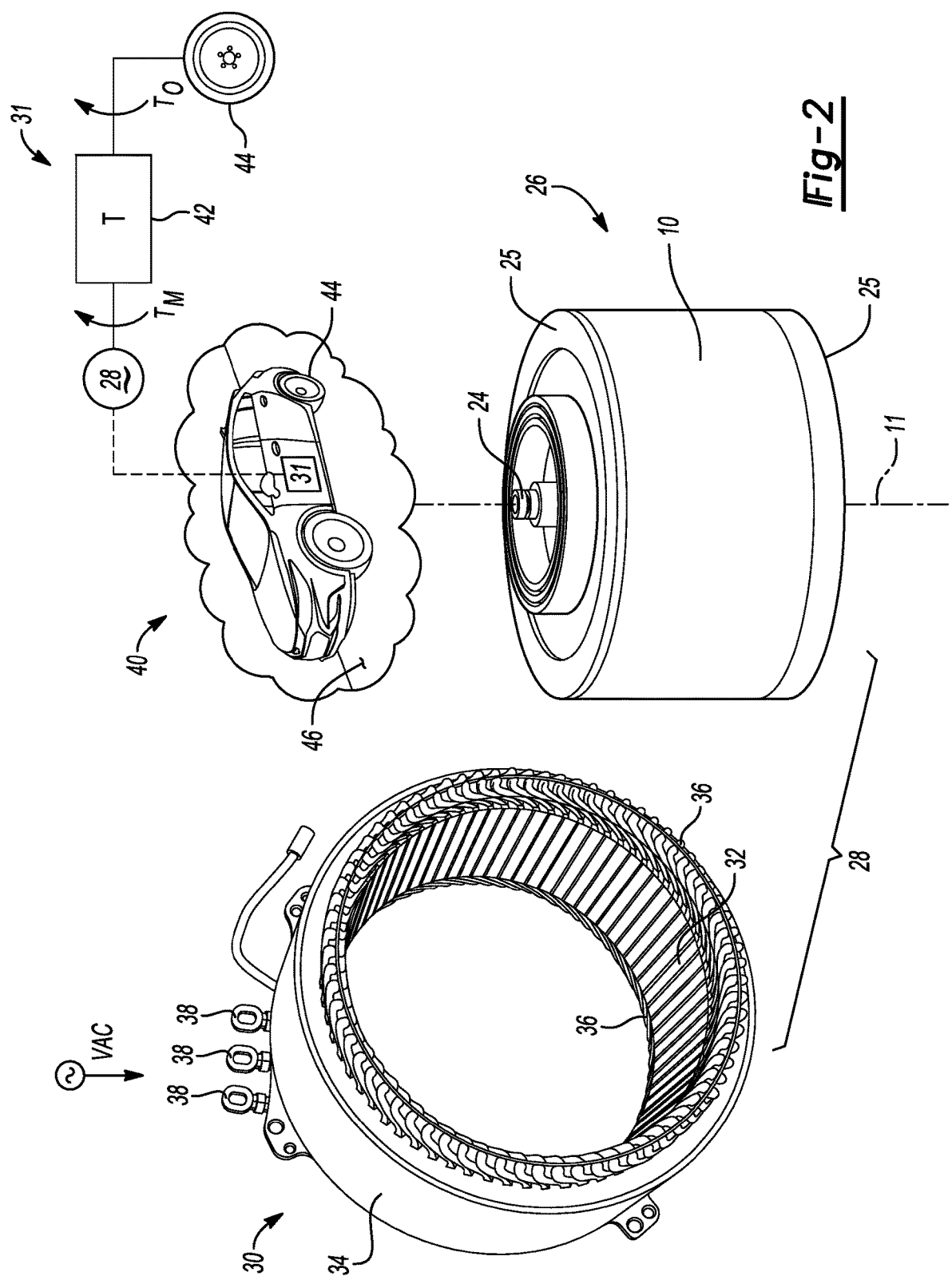
FIG. 2 is a schematic perspective view illustration of stator and a rotor assembly, with the rotor assembly having a rotor stack constructed as set forth herein.
Figure 3:
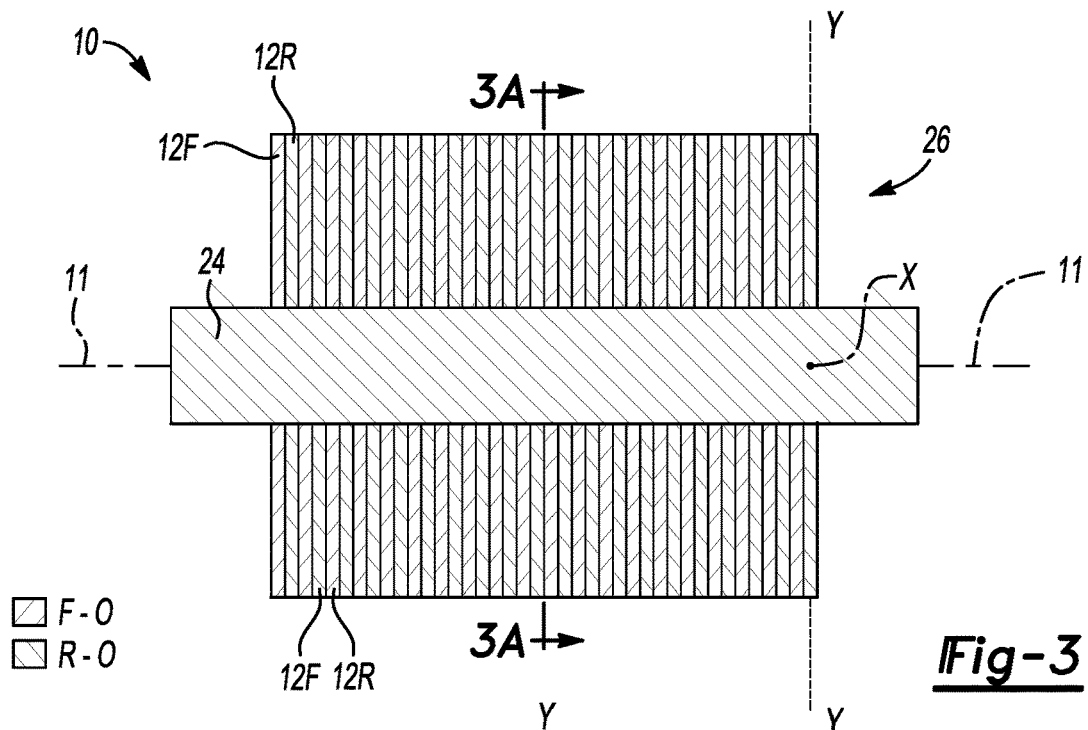
FIG. 3 is a schematic cross-sectional side view illustration of portions of the rotor assembly shown in FIG. 2.
Figure 3A:
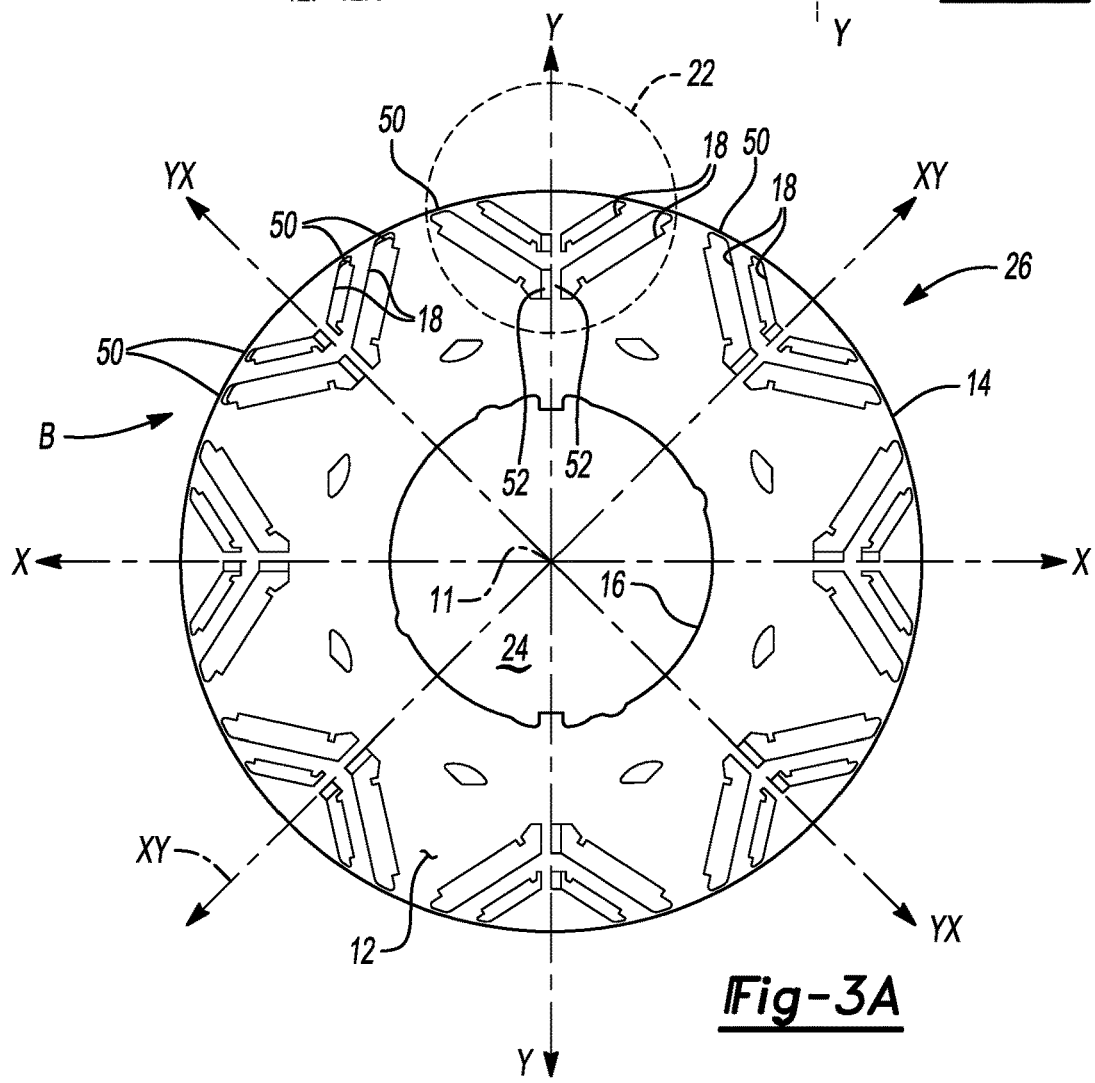
FIG. 3A is a schematic plan view illustration of offset rotor laminations in accordance with the disclosure.

Referring briefly to FIG. 3A, the rotor stack 10 of FIG. 2 may be constructed for use in an interior permanent magnet (IPM) rotary electric machine. To this end, the magnet openings 18 of the individual laminations 12 are asymmetrical. Each magnet opening 18 in the non-limiting IPM embodiment is configured to receive therein a respective permanent magnet 20, e.g., a solid rectangular bar magnet 20L or 20S as shown in FIG. 1. The term "asymmetrical" as used herein means, with respect to an imaginary axis bisecting a given rotor pole, that the magnet openings 18 are slightly larger on one side of such an axis relative to the opposing side. This may entail different sizes on either side of axes X, Y, YX, or XY of FIG. 3A, for instance, such that the struts 52 are not centered on the axis X, Y, YX, or XY, and/or forming the bridges 50 in a similar asymmetrical manner so that flipping the lamination 12 about a suitable axis has the desired effect of offsetting the bridges 50 of two adjacent laminations 12. Such a geometric feature allows the bridges 50 and/or struts 52 of the various web regions 22 to be exposed to a heat-treating atmosphere while remaining surface area of the laminations 12 is shielded by overlapping structure of adjacent or nearest adjacent/neighboring laminations 12.

The magnetic poles of the rotor assembly 26 of FIG. 2 formed from the rotor stack 10 may be optionally constructed using an asymmetrical "single-V" or "dual-V" arrangement of four such permanent magnets 20, with the permanent magnets 20 located adjacent to the outer diameter surface 14. First and second pairs of small and large magnets 20S and 20L may be arranged end-to-end in a V shape, with "S" and "L" being abbreviations for "small" and "large", respectively, and indicating that the small magnets 20S are smaller than the large magnets 20L (see FIG. 1). The first and second pairs or small and large magnets 20S and 20L are arranged at an angle referred to in the art as a V-angle, which opens toward the outer diameter surface 14 in the illustrated embodiment. The above-noted magnet openings 18 are separated from one another by narrow strips of lamination material forming the magnet web regions 22, with the various web regions 22 arranged and selectively heat-treated as set forth below with reference to FIGS. 3-5.

The permanent magnets 20 in various non-limiting example embodiments may be constructed from bar magnets of Neodymium-Iron-Boron (NdFeB), Samarium Cobalt (SmCo), Ferrite, or another application-suitable magnetic material. An exemplary 8-pole embodiment is depicted in FIGS. 1 and 3A, respectively, with the present teachings being readily extendable to these and other pole configurations. Each asymmetrical magnet opening 18 receives therein a respective one of the permanent magnets 20 of FIG. 1, and therefore the magnet openings 18 are sized and shaped to facilitate insertion of the permanent magnets 20 in an axial direction into the rotor stack 10.

Referring once again to FIG. 2, once the rotor stack 10 has been fully constructed according to the methodology set forth below with reference to FIGS. 3-5, and before or after the rotor stack 10 has been subjected to a heat-treating process, the rotor stack 10 is journaled, splined, or otherwise securely connected to a rotor shaft 24. The rotor stack 10 is then sandwiched between a pair of annular end plates 25 disposed at opposite axial ends of the rotor stack 10 to thereby form the rotor assembly 26. To construct the rotary electric machine 28, the rotor assembly 26 may be paired with a stator assembly 30, e.g., by positioning the rotor assembly 26 radially within the stator assembly 30 such that the stator assembly 30 surrounds/circumscribes the rotor assembly 26. Multiple stator teeth 32, the distal ends of which are visible from the perspective of FIG. 2, project radially from a cylindrical stator core or housing 34, with adjacent stator teeth 32 being separated from one another by a respective stator slot (not shown) filled with stator windings 36.

In a polyphase embodiment of such a rotary electric machine 28, an alternating current input voltage (VAC) is applied to terminals of phase leads 38 of the stator windings 36 to thereby energize the stator assembly 30, and to thereby generate a rotating stator magnetic field. As noted above, the permanent magnets 20, visible in FIG. 1, collectively establish a time-invariant rotor magnetic field. The stator and rotor magnetic fields mutually interact to produce and sustain motive forces within a stator-rotor airgap, with such forces ultimately imparting rotation to the rotor assembly 26 of FIG. 2 when used as part of the electric machine 28. Resulting rotation of the rotor assembly 26 about its axis 11 results may be harnessed to perform work in a host of electromechanical systems.

A non-limiting exemplary system benefitting from such rotation is an electric powertrain 31 of the illustrated motor vehicle 40, which may be variously embodied as a hybrid electric or battery electric vehicle. Motor torque (arrow $T_M$) from the electric machine 28 may be being transmitted to a transmission (T) 42 of the motor vehicle 40 either alone or in conjunction with engine torque from an internal combustion engine (not shown). Output torque (arrow $T_O$) from the transmission 42 may be transmitted to one or more road wheels 44 of the motor vehicle 40 to propel the motor vehicle 40 along a road surface 46. Other applications may benefit from the rotor assembly 26 and electric machine 28 when constructed as set forth herein, including other types vehicles such as marine vessels, aircraft, and trains. Mobile platforms and robots may also benefit from the present teachings, as may stationary applications such as power plants, hoists, etc.

Referring again to FIGS. 3 and 3A, a schematic side view of the rotor assembly 26 of FIG. 2 arranged on center axis 11 is depicted with the annular end plates 25 omitted for illustrative simplicity. The rotor shaft 24 is coupled to the rotor stack 10 at the inner diameter surface 16 (see FIG. 3A), with the rotor stack 10 and the rotor shaft 24 rotating in unison about axis 11 when the stator assembly 30 of FIG. 2 is energized in a completed construction of the rotary electric machine 28. The laminations 12 shown in plan view in FIG. 3A, which is taken along cut line 3A-3A of FIG. 3, have either a forward orientation ("F-O") 12F or a rearward orientation ("R-O") 12R. Each lamination 12 is identically configured but oppositely oriented, i.e., the terms "forward" and "rearward" are nominal directions conveying that each successive lamination 12 situated along axis 11 is rotated 180° about its radial/vertical axis Y or X, or in some embodiments about center axis 11. Using a heads/tails coin face analogy, the forward orientation 12F may be thought of as the "heads" side of a coin and the rearward orientation as the "tails" side, with the analogous heads or tails orientation of a given lamination 12 alternating from left to right along the axis 11 as one views FIG. 3. Such a progressive flipping or alternative forward-reverse orientation of the laminations 12 enables selective and isolated heat treatment of the magnet web regions 22 to occur once the rotor stack 10 is fully constructed.

As best shown in FIG. 3A, each magnet web region 22 of a given lamination 12 includes the above-noted bridges 50 and struts 52, which together, along with the transverse reluctance paths 53 of FIG. 1, define the individual magnet openings 18 adjacent to the outer diameter surface 14 of the lamination 12. As part of the disclosed method, the lateral sides of a given magnet web region 22 are slightly offset from center, i.e., axis Y, X, XY, or YX in the illustrated 8-pole embodiment of FIG. 3A. As a result, the offset progression of the web regions 22 when viewed along the axis 11 exposes the bridges 50 and/or struts 52 of adjacent nearest neighboring laminations 12, while at the same time masking the remaining surface area of the nearest neighboring laminations 12. Designated portions of the magnet web regions 22 are thereby left uncovered and fully exposed to a gaseous atmosphere employed in subsequent heat-treating of the assembled rotor stack 10. In this manner, the entire rotor stack 10 may be heat treated, with the alternating orientation of the laminations 12 masking off portions of the rotor stack 10 that should not be heat treated.

The present method facilitates isolated heat treatment and strengthening of the bridges 50 and/or struts 52 of the magnet web region 22 after completing construction of the rotor stack 10. In order to do this, each web region 22 is asymmetrical about a center axis Y, X, XY, or YX of the eight exemplary dual-V magnet configurations. That is, each magnet opening 18 is slightly offset from its respective center axis, with the effect that the magnet openings 18 situated on one side of its corresponding axis are slightly larger than the magnet openings 18 situated on the opposing side of the center axis.

As noted above, the laminations 12 are typically stamped from thin metal blanks or sheets of steel or another ferrous material, and then individually heat treated prior to assembly into a rotor stack. Heat treatment of the laminations 12 individually, however, may have the undesirable effect of increasing the magnetic reluctance of areas of the laminations 12 lying outside of the bridges 50 and struts 52, and may also increase cycle time while possibly introducing the problem of warping. Likewise, application and removal of masking material adds cost and time to the manufacturing process. In contrast, the present method stamps the laminations 12 and then removes the insulating material from the bridges 50 and struts 52, if present. Thereafter, the method includes constructing the rotor stack 10 by alternately orienting the laminations 12 in an offset pattern as explained above and shown in FIGS. 3 and 3A. The rotor stack 10 as a whole is then subjected to a heat-treating process as opposed to heat-treating individual laminations.

For instance, blank sheets of sheet metal may be rolled and evenly coated with insulating material. The coated blanks are then punched or stamped to produce the laminations 12 shown in FIG. 3A. The laminations 12 are then arranged on the rotor shaft 24 of FIG. 3 to reduce cycle time, ensure a maximum stack factor, and eliminate the possibility of stacking warped laminations 12. During assembly, a pattern or assembly may be used so that the bridges 50 and struts 52 of adjacent laminations 12 do not overlap one another. Insulation material is then removed from the web region 22 prior to heat treatment, e.g., using a mechanical process such as abrading or a chemical process such as etching. The rotor stack 10 is then subjected to a predetermined heat-treating process, with non-limiting exemplary heat-treating processes usable with the rotor stack 10 include nitrocarburizing, gaseous nitriding, plasma nitriding, salt bath nitriding, or other high-temperature heat-treating processes where masking of the laminations 12 is viable.

Because of this change in the manufacturing order of the rotor assembly 26 relative to conventional approaches, which when heat-treating at all do so on the individual laminations 12A of FIG. 1 before assembling a rotor stack, it may be necessary to target application of the insulating materials around the magnet web regions 22 in order to avoid coating the bridges 50 and struts 52. Alternatively, one may coat the entire lamination 12 and thereafter remove the insulating material from the bridges 50 and struts 52. When targeting the application of insulating material, the present method may include rolling the insulation material onto the major surfaces of the laminations using a patterned brush or applicator, with the brush or applicator configured with raised or patterned surfaces that do not make contact with the web regions 22 as the brush/applicator passes over the lamination 12. Such an approach would avoid the need for applying masking materials over the web regions 22 and the accompanying need to remove such masking materials.

Figure 4:
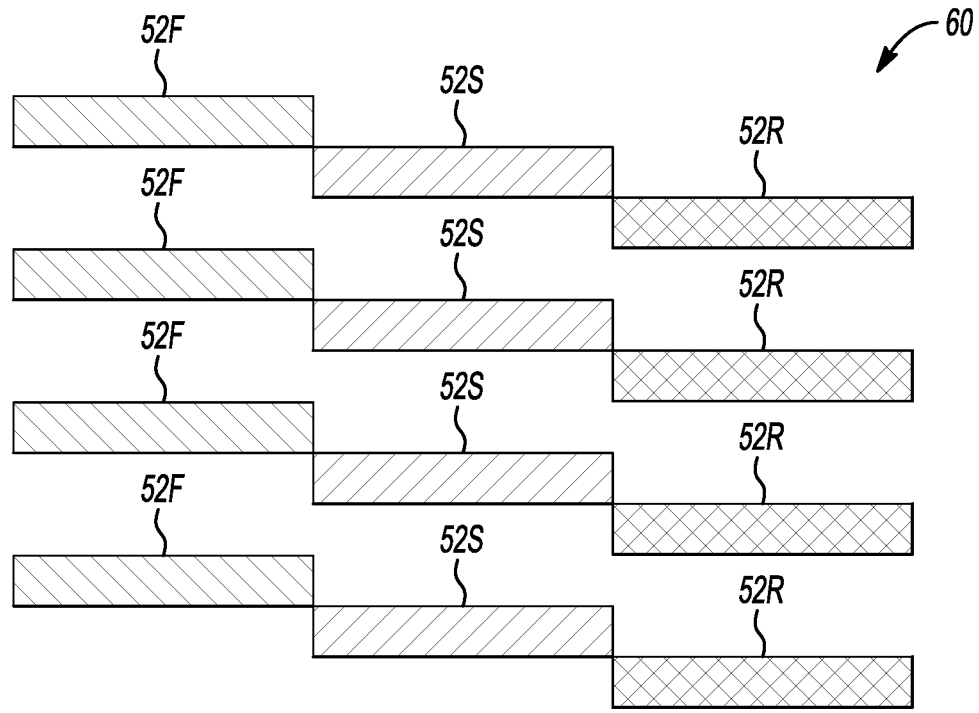
FIGS. 4 and 5 are schematic cross-sectional depictions of two possible staircase stacking patterns usable for optimizing an etchant path to remove insulation material from the rotor laminations.
Figure 5:
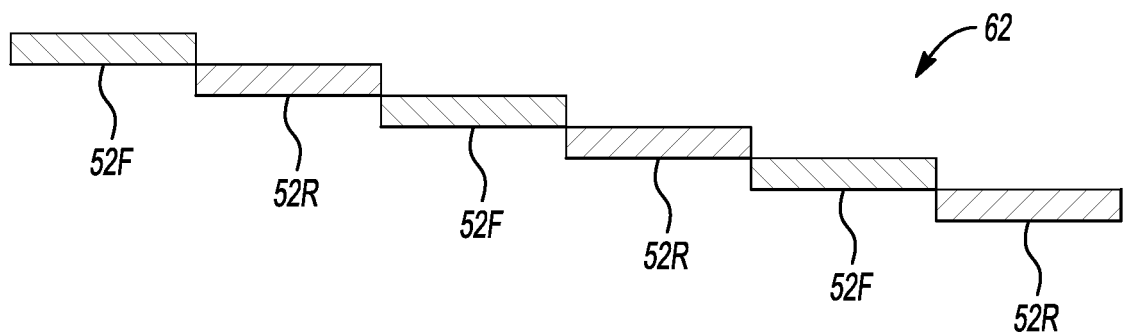

Alternatively, and with reference to FIGS. 4 and 5, exposed surfaces of the laminations 12 may be evenly coated with insulating material, with the web regions 22 thereafter stripped of such material using a mechanical or chemical process. For example, when the above-noted insulating materials are to be chemically removed from the web regions 22 using a suitable etchant, e.g., a nitric acid solution. For instance, laminations 12 may be arranged in two possible "staircase" stacking patterns prior to forming the rotor stack 10 of FIGS. 1 and 3 to provide optimized etchant flow paths.

Pattern 60 of FIG. 4 may entail forming multiple laminations 12 with front and rear orientations 12F and 12R as shown in FIG. 3, as well as laminations 12 with a symmetrical orientation, i.e., in which the magnet openings 18 noted above are symmetrical ("S"). That is, struts 52S with symmetrical orientations may be centered between a respective one of the magnet openings 18 of FIG. 3A. Etchant could then flow freely over the exposed struts 52S, 52F, and 52R, with struts 52F and 52R having respective front and rear orientations. As will be appreciated by those of ordinary skill in the art, a similar pattern 60 may be used for etching of the bridges 50. Pattern 62 of FIG. 5 illustrates six struts 52 arranged in an alternating pattern such that a general step profile is formed from the struts 52, which would enable etchant to flow over the struts 52 in a different manner.

The present teachings enable a method for constructing the rotor assembly 26 use with the rotary electric machine 28 of FIG. 2. As will be appreciated by those of ordinary skill in the art in view of the disclosure, a possible embodiment of the method includes forming a plurality of the annular rotor laminations 12 from metal blanks, with each lamination 12 having a radial axis, e.g., axis Y of FIG. 3A, and the outer diameter surface 14. Such forming defines multiple spaced magnet web regions 22 in proximity to the outer diameter surface 14. Each of the magnet web regions includes multiple magnet openings 18 defined by a radially-extending strut 52 and one or more bridges 50, as well as the transverse reluctance paths 53 of FIG. 1.

The method in this embodiment may include coaxially-stacking the annular rotor laminations 12 to form the rotor stack 10, including rotating or positioning every other one of the laminations 12 about or with respect to one of its radial axes by a predetermined angular distance. For example, every lamination 12 may be rotated by 180° with respect to a radial axis, with respect to its adjacent neighbor(s), to unmask the struts 52 and mask the remaining surface area of the laminations 12. Other rotation patterns may be used to similar effect, e.g., rotation of a first lamination 12 to expose the bridges 50 of an immediate-adjacent second lamination 12 through the magnet openings 18 of the first lamination 12, as indicated by arrow B in FIG. 3A, or by using more than two stages or patterns of orientation along the center axis 11 to expose the bridges 50 and/or struts 52 in a desired manner.

The method may include connecting the rotor shaft 24 of FIGS. 2 and 3 to the rotor stack 10 to construct the rotor assembly 26, before or after heat-treating the rotor stack 10, with the magnet web regions 22 corresponding to a respective magnetic pole of the rotor assembly 26. Thereafter, the rotor assembly 26 may be subjected to a predetermined heat-treating process to harden only the unmasked magnet web regions 22, e.g., a ferritic nitrocarburizing process, a gaseous nitriding process, or a salt bath nitriding process.

In various implementations of the present method, forming the annular rotor laminations 12 may include stamping or punching asymmetric V-shaped magnet openings 18 in each of the laminations 12. The asymmetric V-shaped magnet openings 18 may include a dual-V configuration having first and second V-shaped sets of magnet openings 18, as shown in FIGS. 1 and 3A, each separated by a respective one of the struts 52, and each defining a V-angle that opens toward the outer diameter surface 14.

The metal blanks noted above may be coated with an insulating material. In such a case, the method may include removing the insulating material from the web regions 22 prior to subjecting the rotor assembly 26 to the predetermined heat-treating process. Stacking the laminations 12 may occur in a predetermined staircase pattern, e.g., patterns 60 or 62 of FIGS. 4 and 5, respectively, such that the struts 52 of adjacent laminations 12 do not overlap one another. The method may thereafter include etching the insulating material from the web regions 22 prior to subjecting the rotor assembly 26 to the predetermined heat-treating process.

Upon forming the annular rotor laminations 12 and prior to subjecting the rotor assembly 26 to the predetermined heat-treating process, the method may include coating the laminations with an insulating material without coating the web regions 22. Surfaces of the metal blanks noted above may be evenly coated with an insulating material, in which case the method may include removing the insulating material from the web regions 22 prior to subjecting the rotor assembly 26 to the predetermined heat-treating process. Embodiments of the method may include positioning the rotor assembly 26 of FIG. 2 radially within a stator assembly 30 to thereby construct the rotary electric machine 28. The electric machine 28 may be used to provide torque to the transmission 42 of the motor vehicle 40 shown schematically in FIG. 2.

The present methodology thus purposefully uses opposing orientations of neighboring laminations 12 to expose the bridges 50 and struts 52 of FIG. 3A to a heat-treating atmosphere, while at the same time masking the remaining surface area of the adjacent laminations 12. This approach also prevents the bridges 50 and struts 52 from conducting electricity even with the insulating coating fully removed. The magnet web regions 22 are thereby sufficiently and effectively hardened without reducing the magnetic permeability of ferrous areas of the rotor laminations 12 lying outside of the magnet web region 22. Additionally, the strengthened magnet web region 22 may help enable higher speed operation and provide other structural benefits without requiring a corresponding increase in thickness of the magnet web region 22. These and other benefits will be readily appreciated by those of ordinary skill in the art in view of the foregoing disclosure.

While some of the best modes and other embodiments have been described in detail, various alternative designs and embodiments exist for practicing the present teachings defined in the appended claims. Those skilled in the art will recognize that modifications may be made to the disclosed embodiments without departing from the scope of the present disclosure. Moreover, the present concepts expressly include combinations and sub-combinations of the described elements and features. The detailed description and the drawings are supportive and descriptive of the present teachings, with the scope of the present teachings defined solely by the claims.

What is claimed is:

1. A method for constructing a rotor assembly for use with a rotary electric machine, the method comprising:
   forming a plurality of annular rotor laminations from metal blanks, wherein each of the annular rotor laminations has an outer diameter surface and defines multiple magnet web regions in proximity to the outer diameter surface, wherein the annular rotor laminations are coated with an insulating material that does not coat the magnet web regions, and wherein each respective one of the magnet web regions includes multiple asymmetrical openings having first and second distal ends defined by respective radially-extending struts and arcuate peripheral bridges, each respective one of the multiple asymmetrical openings being separated from the outer diameter surface by one of the arcuate peripheral bridges;
   coaxially stacking the annular rotor laminations to thereby form a rotor stack, including positioning the annular rotor laminations at a predetermined angular distance with respect to a radial axis or a longitudinal center axis of the rotor stack to thereby uncover or unmask the struts and/or bridges and cover or mask a remaining surface area of the annular rotor laminations; and
   subjecting the rotor stack to the heat-treating process to thereby harden only the uncovered or unmasked bridges and/or struts.

2. The method of claim 1, wherein the predetermined angular distance is 180 degrees.

3. The method of claim 1, wherein forming the plurality of annular rotor laminations includes stamping or punching, as the asymmetrical openings, one or more asymmetrical V-shaped openings in each of the magnet web regions of the annular rotor laminations.

4. The method of claim 3, wherein the asymmetrical V-shaped openings include first and second V-shaped sets of openings separated by a respective one of the struts, and each defining a V-angle that opens toward the outer diameter surface.

5. The method of claim 1, wherein the metal blanks are coated with the insulating material prior to forming the plurality of annular rotor laminations, the method further comprising removing the insulating material from the web regions prior to subjecting the rotor assembly to the heat-treating process.

6. The method of claim 5, further comprising stacking the plurality of laminations in a predetermined pattern such that the struts and/or bridges of an adjacent pair of the laminations do not overlap, and then etching the insulating material from the web regions prior to subjecting the rotor stack to the heat-treating process.

7. The method of claim 1, further comprising, after forming the plurality of annular rotor laminations and prior to subjecting the rotor assembly to the heat-treating process, coating the annular rotor laminations with the insulating material without coating the web regions.

8. The method of claim 1, wherein surfaces of the metal blanks are coated with the insulating material, the method further comprising removing the insulating material only from the web regions prior to subjecting the rotor stack to the heat-treating process.

9. The method of claim 1, wherein subjecting the rotor assembly to the heat-treating process includes subjecting the rotor assembly to a ferritic nitrocarburizing process, a gaseous nitriding process, or a salt bath nitriding process.

10. The method of claim 1, further comprising:
    connecting a rotor shaft to the rotor stack to thereby construct the rotor assembly, with the magnet web regions corresponding to a respective magnetic pole of the rotor; and
    positioning the rotor assembly radially within a stator assembly to thereby construct the rotary electric machine.

11. The method of claim 10, further comprising using the rotary electric machine to provide torque to a transmission of a motor vehicle.

12. A rotary electric machine comprising:
    a stator assembly; and
    a rotor assembly disposed radially within the stator assembly and having:
        a rotor stack constructed of a coaxially-stacked plurality of annular rotor laminations, wherein each of the rotor laminations has a radial axis and an outer diameter surface and defines multiple asymmetrical heat-treated magnet web regions in proximity to the outer diameter surface, each of the asymmetrical magnet web regions including multiple openings defined by radially-extending struts and one or more arcuate peripheral bridges, wherein each respective one of the asymmetrical magnet web regions is separated from the outer diameter surface by one of the arcuate peripheral bridges, and wherein every other one of the annular rotor laminations is positioned a predetermined angular distance with respect to a radial axis or a center axis of the rotor stack to thereby uncover or unmask the bridges and/or the struts and cover or mask a remaining surface area of the annular rotor laminations;
        a pair of end plates each connected to an opposite axial end of the rotor stack; and
        a rotor shaft connected to an inner diameter surface of the annular rotor laminations;
    wherein the magnet web regions correspond to a respective magnetic pole of the rotor assembly, and the annular rotor laminations are coated by an insulating material that does not coat the web regions.

13. The rotary electric machine of claim 12, wherein the predetermined angular distance is 180 degrees.

14. The rotary electric machine of claim 12, wherein the asymmetrical openings include first and second V-shaped sets of openings each separated by a respective one of the struts, and each defining a V-angle that opens toward the outer diameter surface.

15. The rotary electric machine of claim 12, wherein the rotary electric machine is connected to a transmission of a motor vehicle.

16. The rotary electric machine of claim 12, wherein the rotary electric machine is an interior permanent magnet motor, and wherein a respective permanent magnet is positioned within each of the openings.

17. A method for constructing a rotary electric machine, the method comprising:

forming a plurality of annular rotor laminations from metal blanks, wherein each of the annular rotor laminations has a radial axis and an outer diameter surface, and thereby defining multiple magnet web regions in proximity to the outer diameter surface, wherein each of the magnet web regions includes a pair of asymmetrical V-shaped openings defined by radially-extending struts and one or more arcuate peripheral bridges, and having a V-angle opening toward the outer diameter surface;

coaxially stacking the annular rotor laminations to thereby form a rotor stack, including positioning every other one of the annular rotor laminations a predetermined angular distance with respect to the radial axis or a longitudinal center axis of the rotor stack to unmask the bridges and/or struts and mask a remaining surface area of the annular rotor laminations;

removing an insulating material from the web regions;

subjecting the rotor stack as a whole to a heat-treating process to harden only the unmasked bridges and/or struts;

connecting a rotor shaft to the rotor stack to construct the rotor assembly, with the magnet web regions corresponding to a respective magnetic pole of the rotor; and positioning the rotor assembly radially within a stator assembly to thereby construct the rotary electric machine.

18. The method of claim 17, wherein the predetermined angular distance is 180 degrees.

19. The method of claim 17, wherein removing the insulating material from the web regions includes:

stacking the plurality of laminations in a predetermined pattern such that the struts of adjacent laminations do not overlap; and thereafter etching the insulating material from the web regions prior to subjecting the rotor stack to the heat-treating process.

20. The method of claim 17, wherein subjecting the rotor stack to the heat-treating process includes subjecting the rotor stack to a ferritic nitrocarburizing process, a gaseous nitriding process, plasma nitriding, or a salt bath nitriding process.

* * * * *